(12) United States Patent
McKenney et al.

(10) Patent No.: US 7,953,708 B2
(45) Date of Patent: May 31, 2011

(54) OPTIMIZING GRACE PERIOD DETECTION FOR PREEMPTIBLE READ-COPY UPDATE ON UNIPROCESSOR SYSTEMS

(75) Inventors: Paul E. McKenney, Hillsboro, OR (US); Joshua A. Triplett, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 12/181,125

(22) Filed: Jul. 28, 2008

(65) Prior Publication Data

US 2010/0023559 A1    Jan. 28, 2010

(51) Int. Cl.
    *G06F 7/00* (2006.01)
(52) U.S. Cl. ...................................................... 707/689
(58) Field of Classification Search .................... None
    See application file for complete search history.

(56) References Cited

U.S. PATENT DOCUMENTS

| | | | |
|---|---|---|---|
| 5,442,758 A | | 8/1995 | Slingwine et al. |
| 5,515,538 A | * | 5/1996 | Kleiman ........................ 710/260 |
| 5,608,893 A | | 3/1997 | Slingwine et al. |
| 5,727,209 A | | 3/1998 | Slingwine et al. |
| 6,173,375 B1 | * | 1/2001 | Arshad ........................ 711/152 |
| 6,219,690 B1 | | 4/2001 | Slingwine et al. |
| 6,490,671 B1 | * | 12/2002 | Frank et al. ................... 711/207 |
| 6,886,162 B1 | | 4/2005 | McKenney |
| 6,996,812 B2 | | 2/2006 | McKenney |
| 7,287,135 B2 | | 10/2007 | McKenney et al. |
| 7,353,346 B2 | | 4/2008 | McKenney et al. |
| 2005/0149634 A1 | | 7/2005 | McKenney |
| 2005/0198030 A1 | | 9/2005 | McKenney |
| 2006/0100996 A1 | | 5/2006 | McKenney |
| 2006/0112121 A1 | | 5/2006 | McKenney et al. |
| 2006/0117072 A1 | | 6/2006 | McKenney |
| 2006/0123100 A1 | | 6/2006 | McKenney |
| 2006/0130061 A1 | | 6/2006 | McKenney |
| 2006/0265373 A1 | | 11/2006 | McKenney et al. |
| 2007/0083565 A1 | | 4/2007 | McKenney |
| 2007/0101071 A1 | | 5/2007 | McKenney |
| 2007/0198520 A1 | | 8/2007 | McKenney et al. |
| 2007/0226440 A1 | | 9/2007 | McKenney et al. |
| 2007/0266209 A1 | | 11/2007 | McKenney et al. |
| 2008/0033952 A1 | | 2/2008 | McKenney et al. |
| 2008/0040720 A1 | | 2/2008 | McKenney et al. |
| 2008/0082532 A1 | | 4/2008 | McKenney |

(Continued)

OTHER PUBLICATIONS

J. Seigh, "RCU + SMR for preemptive kernel/user threads," Linux Kernel Mailing List, May 5, 2009, 2 pages.

(Continued)

*Primary Examiner* — Don Wong
*Assistant Examiner* — Belinda Xue
(74) *Attorney, Agent, or Firm* — Walter W. Duft

(57) ABSTRACT

A technique for optimizing grace period detection following a data element update operation that affects preemptible data readers. A determination is made whether the data processing system is a uniprocessor system or a multiprocessor system. Grace period detection processing is performed using a first grace period detection technique if the data processing system is a multiprocessor system. Grace period detection processing is performed using a second grace period detection technique if the data processing system is a uniprocessor system. The grace period detection processing according to either technique determines the end of a grace period in which readers that are subject to preemption have passed through a quiescent state and cannot be maintaining references to the pre-update view of the shared data.

20 Claims, 15 Drawing Sheets

U.S. PATENT DOCUMENTS

2008/0140951 A1    6/2008    McKenney et al.
2008/0177742 A1    7/2008    McKenney et al.

OTHER PUBLICATIONS

M. Michael, "Hazard Pointers: Safe Memory Reclamation for Lock-Free Objects," IEEE Transactions On Parallel and Distributed Systems, Jun. 2004, vol. 15, No. 6, pp. 491-504.

D. Sarma et al., "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," Llnux Journal, Oct. 1, 2003, 11 pages.

P. McKenney et al.,"Read-Copy Update," 2002 Ottawa Linux Symposium, Jul. 8, 2002, 28 pages.

H. Linder et al., "Scalability of the Directory Entry Cache," 2002 Ottawa Linux Symposium, Jun. 26, 2002, pp. 289-300.

P. Mckenney et al., "Read-Copy Update," 2001 Ottawa Linux symposium, Jul. 2001, 22 pages.

P. McKenney et al., "Read-Copy Update: Using Execution History to Solve Concurrency Problems," PDCS, Oct. 1998, 11 pages.

S. Dietrich et al., "Evolution of Real-Time Linux," 7th RTL Workshop, Nov. 17, 2005, 18 pages.

B. Gamsa, "Tornado: Maximizing Locality and Concurrency in a Shared Memory Multiprocessor Operating System," 1999, 14 pages.

Molnar et al., "Realtime and Linux," 2005 Linux Kernel Summit, 8 pages.

H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.

M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.

D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.

J. Corbet, "Read-copy-update for realtime," LWN.net, Sep. 26, 2006, 3 pages.

"Priority Inversion," Wikipedia, Feb. 4, 2007, 3 pages.

McKenney, "Seven real-time Linux approaches (Part C)", LinuxDevices.com, Jun. 7, 2005, 13 pages.

P. McKenney, " RCU and CONFIG_PREEMPT_RT progress," Linux Kernel Mailing List, May 9, 2005, 2 pages.

O. Nesterov, QRCU: 'Quick' SRCU Implementation, Linux Kernel Mailing List, Dec. 1, 2005, 3 pages.

T. Gleixner, "High Resolution Timers/Dynamic Ticks-V2", LWN.net, Oct. 1, 2006, 6 pages.

P. Mckenney, "Sleepable RCU", LWN.net, Oct. 9, 2006, 10 pages.

O. Nesterov, "cpufreq_tsc() as core_initcall_sync", LKML.org, Nov. 19, 2006, 2 pages.

P. McKenney, "Using RCU in the Linux 2.5 Kernel", Kernel Korner, Oct. 1, 2003,11 pages.

A. Kleen, "How to do nothing efficiently or better laziness: No Idle tick on x86-64", 2005, 16 pages.

P. McKenney, "Read-Copy Update Implementations", 2001, 3 pages.

M. Herlihy, "A Methodology for Implementing Highly Concurrent Data Objects," ACM Transactions on Programming Languages and Systems, vol. 15, Issue 5, Nov. 1993, pp. 745-770.

M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.

N. Barghouti et al, "Concurrency Control in Advanced Database Operations," Jan. 1994, 83 pages.

P. McKenney, "Exploiting Deferred Destruction: An Analysis of Read-Copy-Update Techniques in Operating System Kermels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2006, 15 pages.

P. McKenney, "The design of preemptible read-copy-update," LWN.net Oct. 8, 2007, 27 pages.

* cited by examiner

OPTIMIZING GRACE PERIOD DETECTION FOR PREEMPTIBLE READ-COPY UPDATE ON UNIPROCESSOR SYSTEMS

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns an implementation of a mutual exclusion mechanism known as "read-copy update" in a uniprocessor computing environment.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. These other read operations will never see the stale data and so the updater does not need to be concerned with them. However, the updater does need to avoid prematurely removing the stale data being referenced by the first group of read operations. Thus, in the second (deferred update) phase, the old data state is removed following a "grace period" that is long enough to ensure that all executing operations will no longer maintain references to the pre-update data. The second-phase update operation typically comprises freeing a stale data element. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock, allocating new memory for B', copying the contents of B to B', modifying B' as needed, updating the pointer from A to B so that it points to B', and releasing the lock. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU (as can other operations that will not be listed here).

In FIG. 3, four processes 0, 1, 2, and 3 running on four separate CPUs (Central Processing Units) are shown to pass periodically through quiescent states (represented by the double vertical bars). The grace period (shown by the dotted vertical lines) encompasses the time flame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period. One technique is to accumulate deferred update requests as callbacks (e.g., on callback lists), then perform batch callback processing at the end of the grace period. This represents asynchronous grace period processing. Updaters can perform first phase updates, issue callback requests, then resume operations with the knowledge that their callbacks will eventually be processed at the end of a grace period. Another commonly used technique is to have updaters perform first phase updates, block (wait) until a grace period has completed, and then resume to perform the deferred updates. This represents synchronous grace period processing.

Read-copy update has been used in production for many years in various operating system kernel environments, including the Linux® kernel. In non-preemptible kernels, grace period detection processing can be performed by observing natural quiescent states (e.g., context switch, user mode or idle loop) or by inducing such states (e.g., by forcing a context switch). In preemptible kernels, an executing RCU reader can be preempted by a higher priority task. Such preemption may occur even while the reader is in a kernel mode critical section referencing RCU-protected data elements. Although reader preemption represents a context switch, it may not be validly used for grace period detection. For that reason, RCU versions designed for preemptible environments (hereinafter "preemptible RCU") do not rely on natural quiescent states. Instead, readers define their own quiescent states by registering and unregistering for RCU critical section processing as they respectively enter and leave RCU critical sections.

A grace period is determined to expire when all readers that registered after the beginning of the grace period have subsequently unregistered. For some preemptible RCU implementations, this grace period detection effort requires coordination among the various processors that may be running RCU readers. Readers need to know when updaters start new grace periods, and updaters need to be certain that readers have exited their RCU critical sections before declaring the end of old grace periods. Due in large part to CPU and/or compiler optimizations that allow memory accesses to be performed out of order, the coordination effort required for some types of preemptible RCU grace period detection can be significant.

Although preemptible RCU is commonly used in multi-processor environments, it may also be used in uniprocessor environments. For example, many small embedded real-time systems are still uniprocessor systems. Such systems can often benefit from RCU, and thus may utilize preemptible RCU as an alternative to other mutual exclusion mechanisms. However, applicants have determined that the existing grace period detection methods used by some implementations of preemptible RCU may not be optimal for uniprocessor environments.

SUMMARY OF THE INVENTION

A method, system and computer program product for optimizing grace period detection following a data element update operation that affects preemptible data readers. A determination is made whether the data processing system is a uniprocessor system or a multiprocessor system. Grace period detection processing is performed using a first grace period detection technique if the data processing system is a multiprocessor system. Grace period detection processing is performed using a second grace period detection technique if the data processing system is a uniprocessor system. The grace period detection processing according to either technique determines the end of a grace period in which readers that are subject to preemption have passed through a quiescent state and cannot be maintaining references to the pre-update view of the shared data.

BRIEF DESCRIPTION OF THE DRAWINGS

The foregoing and other features and advantages of the invention will be apparent from the following more particular description of example embodiments, as illustrated in the accompanying Drawings, in which.

DETAILED DESCRIPTION OF EXAMPLE EMBODIMENTS

Figure 1A:
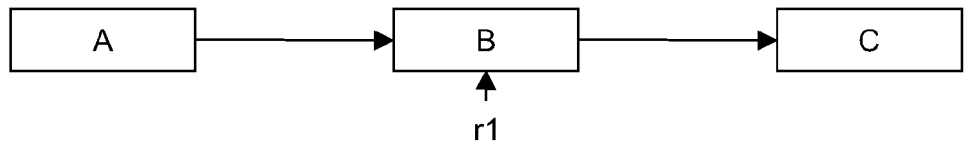
FIGS. 1A-1D are diagrammatic representations of a linked list of data elements undergoing a data element replacement according to a conventional read-copy update mechanism.
Figure 1B:
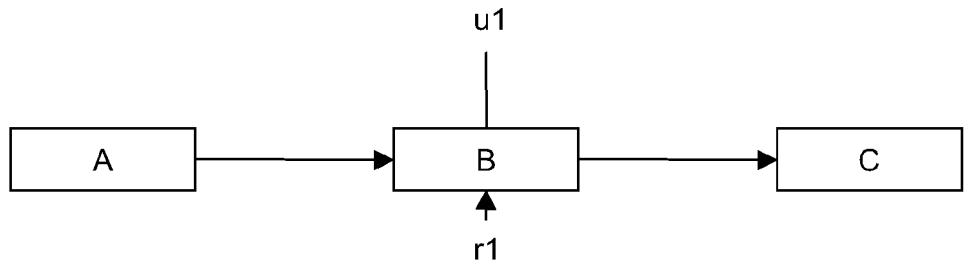
Figure 1C:
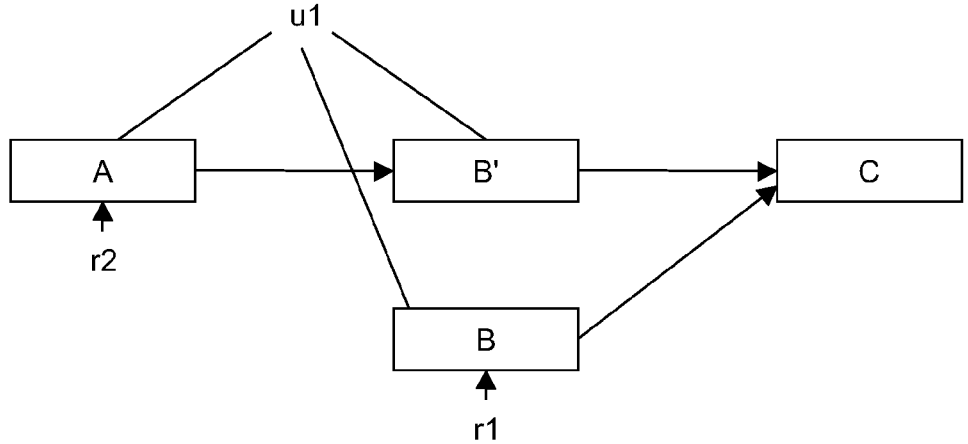
Figure 1D:
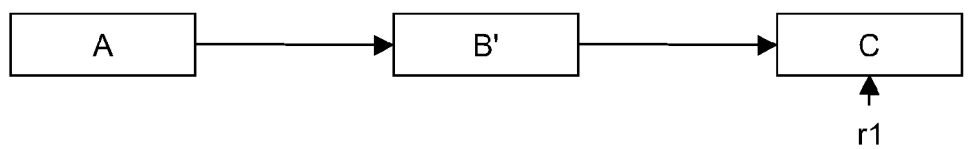
Figure 2A:
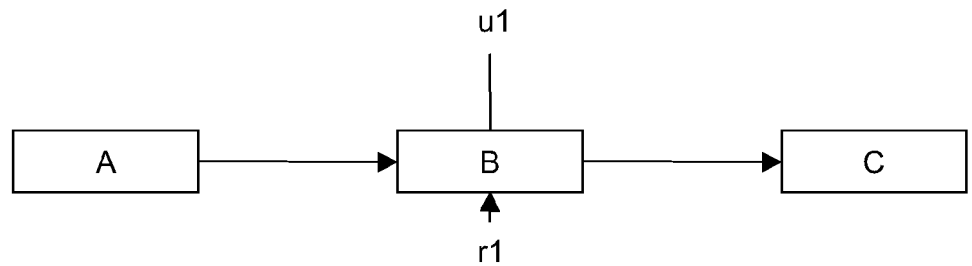
FIGS. 2A-2C are diagrammatic representations of a linked list of data elements undergoing a data element deletion according to a conventional read-copy update mechanism.
Figure 2B:
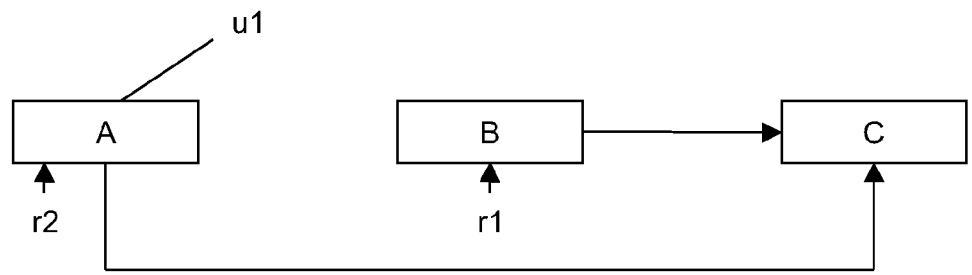
Figure 2C:
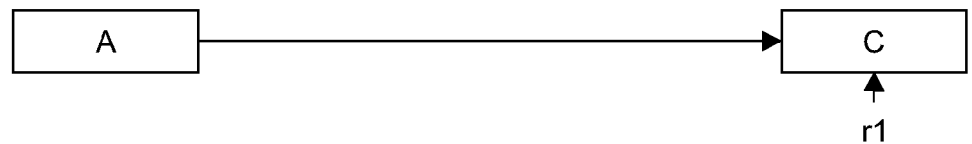
Figure 3:
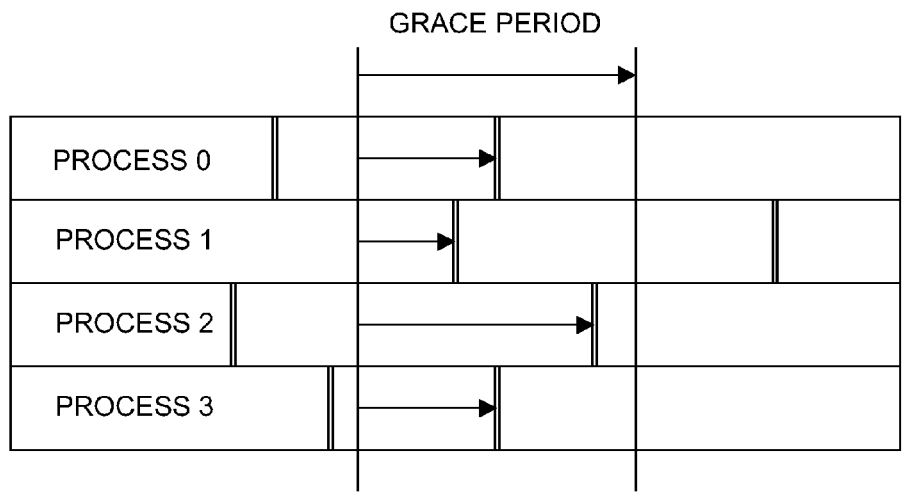
FIG. 3 is a flow diagram illustrating a grace period in which four processes pass through a quiescent state.
Figure 4:
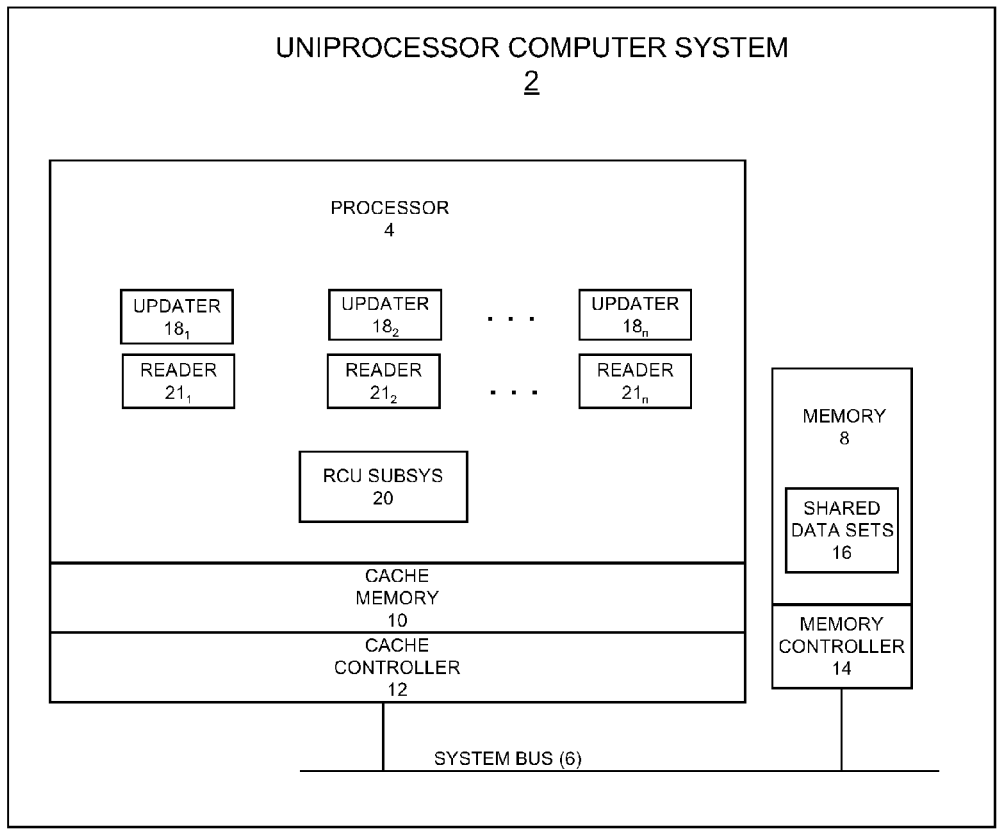
FIG. 4 is a functional block diagram showing a computing system that represents an example environment that may be used for optimizing preemptible RCU grace period detection for uniprocessor operation.

Turning now to the figures, wherein like reference numerals represent like elements in all of the several views, FIG. 4 illustrates an example computing environment in which the present invention may be implemented. In particular, a uniprocessor computing system 2 is shown in which a processor 4 is connected by way of a system bus 6 to a memory 8. A conventional cache memory 10 and a cache controller 12 are associated with the processor 4. A conventional memory controller 14 is associated with the memory 8.

It is assumed in FIG. 4 that update operations executed within kernel-level or user-level processes or threads (or other execution contexts) will periodically perform updates on a set of shared data 16 stored in the memory 8. Reference numerals $18_1, 18_2 \ldots 18_n$ illustrate individual update operations (updaters) that may periodically execute on the processor 4. As described by way of background above, the updates performed by the data updaters $18_1, 18_2 \ldots 18_n$ can include modifying elements of a linked list, inserting new elements into the list, deleting elements from the list, and many other types of operations (involving lists or other data structures). To facilitate such updates, the processor 4 is programmed to implement a read-copy update (RCU) subsystem 20 as part of its kernel-level or user-level functions. The processor 4 also periodically executes kernel-level or user-level read operations (readers) $21_1, 21_2 \ldots 21_n$ on the shared data 16. Such read operations will typically be performed far more often than updates, insofar as this is one of the premises underlying the use of read-copy update. The updaters $18_1, 18_2 \ldots 18_n$ and the readers $21_1, 21_2 \ldots 21_n$ are assumed to be preemptible, which would be the case if the system 2 supports real-time operation. As such, it would be possible for several of the readers $21_1, 21_2 \ldots 21_n$ to maintain simultaneous references to the shared data elements 16 while an updater $18_1, 18_2 \ldots 18_n$ updates the same data elements (e.g., within the context of a preempting real-time process or thread, or from interrupt context).

The read-copy update subsystem 20 may be implemented in the environment of FIG. 4 using any of various preemptible RCU implementations. These include the real-time RCU, sleepable RCU (SRCU) and quick SRCU (QRCU) implementations found in recent versions of the Linux® kernel. Each of these preemptible RCU variants uses reader registration and unregistration, as described above in the section entitled "Background of the Invention," to implement grace period detection processing. The reader registration, reader unregistration and grace period detection functions are supported by RCU primitives within the RCU subsystem 20. These primitives are respectively illustrated in FIG. 5 by reference numerals 22, 24 and 26.

Figure 6:
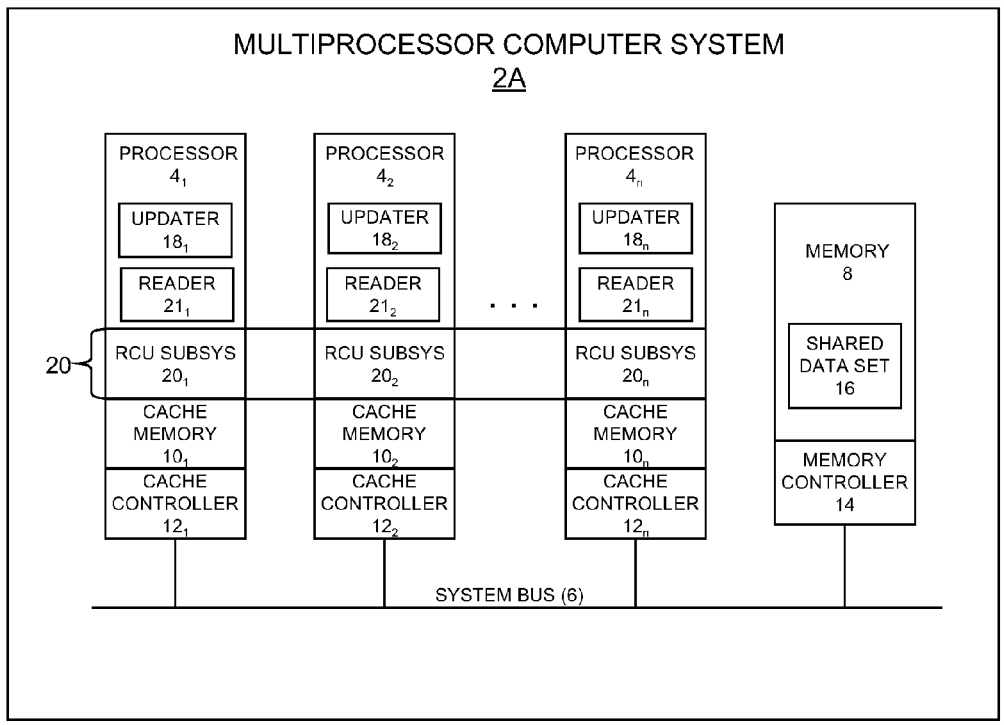
FIG. 6 is a functional block diagram showing another computing system that represents an alternative example environment that may be used for optimizing preemptible RCU grace period detection for uniprocessor operation.

As also earlier described in the section entitled "Background of the Invention," some preemptible RCU implementations, particularly those mentioned in the preceding paragraph, required coordinated grace period detection processing in multiprocessor systems. This coordination effort can require a processor to spend significant time waiting for other processors to take certain grace period detection actions. Applicants have observed that grace period detection coordination is not required in uniprocessor systems and have developed a solution whereby such processing may be avoided in a uniprocessor environment. In particular, the solution proposed herein is to condition grace period detection processing on the number of processors that are present in a system. If two or more processors are active, the aforementioned grace period detection coordination is performed. If only one processor is active, grace period detection coordination between processors need not be performed. The system 2 of FIG. 4 represents one environment wherein this condition would hold. Another example would be a multiprocessor environment in which only one processor is active (e.g., a system with hot-pluggable CPUs). An example of this is illustrated in FIG. 6 by the hot-pluggable multiprocessor system 2A. In this system, there are multiple processors $4_1, 4_2 \ldots 4_n$ with associated cache memories $10_1, 10_2 \ldots 10_n$ and cache controllers $12_1, 12_2 \ldots 12_n$. The RCU subsystem 20 may be distributed over the processors $4_1, 4_2 \ldots 4_n$ as RCU subsystem instances $20_1, 20_2 \ldots 20_n$. Because the system 2A can be placed in a state where all but one of the processors $4_1, 4_2 \ldots 4_n$ is inactive (effectively becoming a uniprocessor system), the conditional grace period detection solution described herein may be used.

Grace period detection processing for uniprocessor environments may be conditioned in a variety of ways. One technique would be to set the grace period detection condition statically at compile time by conditionally compiling the RCU subsystem based on a multiprocessor vs. uniprocessor compiler preprocessor directive. In Linux®, the condition could be based on the CONFIG_SMP kernel configuration (Kconfig) option. Example preprocessor directive pseudo code could be implemented as follows:

```
#ifdef CONFIG_SMP
#define gp_detection( ) smp_gp_detection( )
#else gp_detection( ) up_gp_detection( )
#endif
```

In this case, the smp_gp_detection( ) function performs grace period detection with processor coordination in a multiprocessor environment, whereas the up_gp_detection( ) performs grace period detection without processor coordination in a uniprocessor environment. The gp_detection( ) function will be set for the appropriate environment at compile time.

Figure 7:
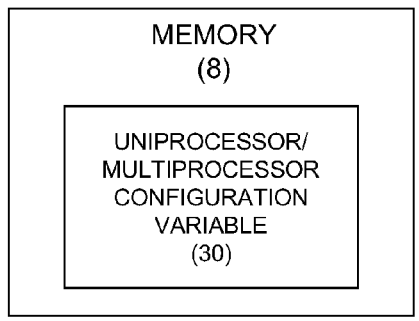
FIG. 7 is a functional block diagram showing a system configuration variable that may be used for optimizing preemptible RCU grace period detection for uniprocessor operation.

Another technique for conditioning grace period detection processing would be to set the grace period condition dynamically at run time. This could be done by consulting system configuration information provided at compile time, at boot time or at run time. For example, as shown in FIG. 7, a system configuration variable 30 could be defined at compile time to indicate either a uniprocessor or multiprocessor configuration. Example pseudo code using preprocessor directives could be implemented as follows:

```
Static const int config_smp =
#ifdef CONFIG_SMP
            1;
#else
            0;
#endif
```

As can be seen, the config_smp configuration variable 30 will be defined as 1 for multiprocessor code compilations and 0 for uniprocessor compilations. At run time, the config_smp variable can be tested to condition grace period detection according to the appropriate system configuration.

Still another technique for dynamically conditioning grace period detection processing would be to select the grace period detection according to a kernel boot parameter passed at boot time. The kernel initialization code could set the configuration variable 30 (such as config_smp above) according a boot parameter that indicates whether or not uniprocessor or multiprocessor grace period detection processing is to be used by the RCU subsystem 20. As in the example given in the preceding paragraph, the RCU subsystem 20 would then be programmed to inspect the configuration variable 30 in order to dynamically determine whether uniprocessor-mode or multiprocessor-mode grace period detection is to be used.

Still another technique for dynamically conditioning grace period detection processing would be to set the configuration variable 30 according to the current number of active processors. In a hotpluggable environment such the system 2A of FIG. 6, the number of online processors may be readily determined from the kernel. For example, if the RCU subsystem 20 is implemented in a Linux® kernel, it may call the existing "num_online_cpus( )" function to dynamically determine whether the system is currently operating as a uniprocessor or multiprocessor system. Other techniques may be used if the RCU subsystem 20 is implemented in user space. Once the number of processors is determined, the configuration variable 30 (such as config_smp above) may be set to specify the environment (uniprocessor or multiprocessor). Alternatively, because the configuration variable 30 is not really needed in this case, the RCU subsystem 20 could simply set its grace period detection by direct evaluation of the number of processors (e.g., using the results returned by the num_online_cpus( ) function).

Figure 8A:
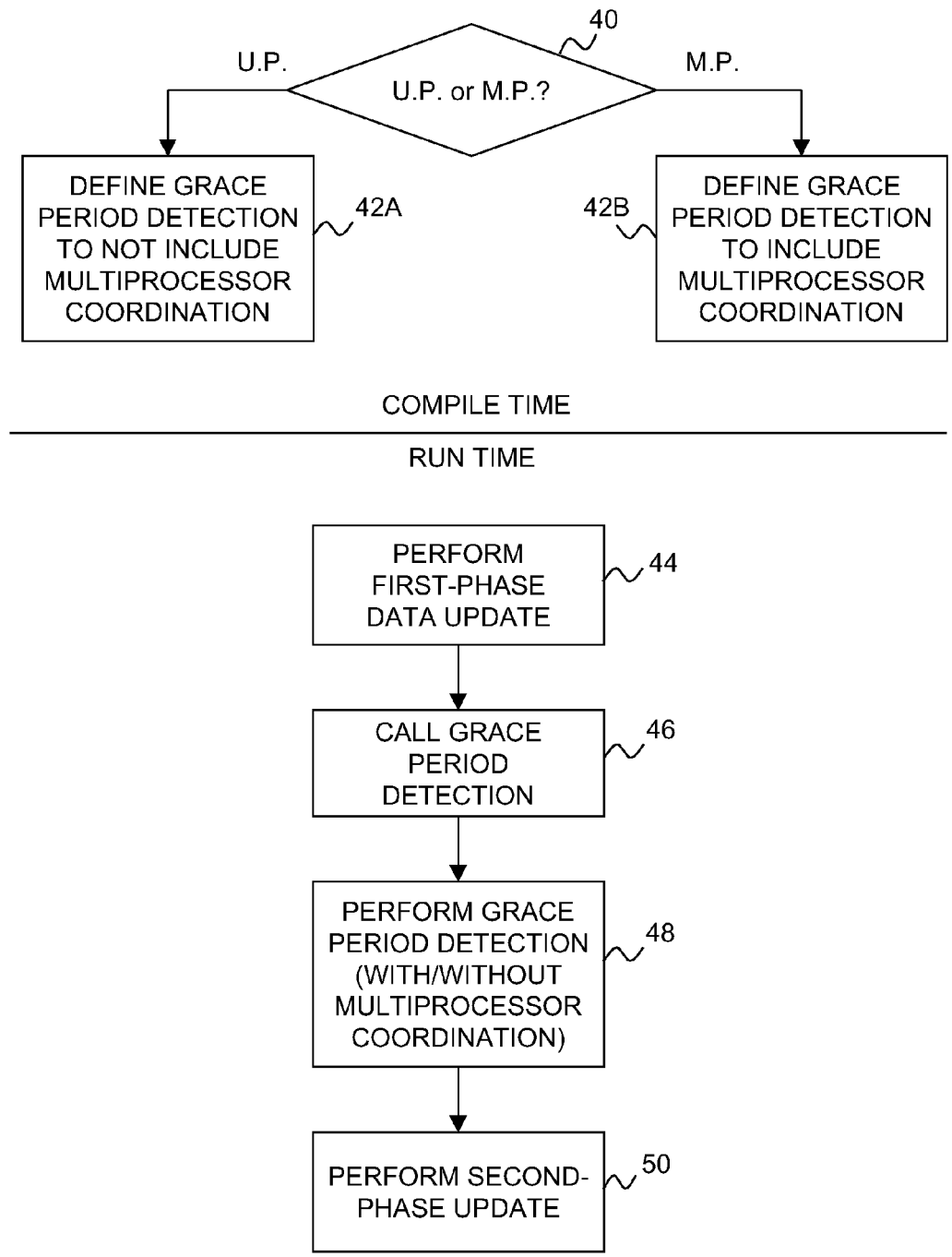
FIG. 8A is a flow diagram showing a first example of optimizing preemptible RCU grace period detection processing in accordance with the technique disclosed herein.

Turning now to FIG. 8A, example processing is shown that may be performed by the RCU subsystem 20 to statically condition grace period detection at compile time, then automatically implement the appropriate type of grace period detection at run time. The initial processing shown in blocks 40, 42A and 42B occurs at compile time. The subsequent processing shown in blocks 44-50 occurs at run time. In block 40, a compiler is instructed via a preprocessor directive to compile for either a uniprocessor or multiprocessor environment. If uniprocessor compilation is directed, block 42A is implemented and grace period detection is compiled so as to not include multiprocessor coordination functionality. On the other hand, if multiprocessor compilation is directed, block 42B is implemented and grace period detection is compiled so as to include the required multiprocessor coordination functionality. During run time, an updater $18_1$, $18_2$ ... $18_n$ implements block 44 by performing an update to the shared data set 18 shown in FIGS. 4 and 6. In accordance the philosophy of RCU, this update is performed in a manner (first-phase data update) that temporarily preserves a pre-update view of the shared data for the benefit of readers that may be concurrently referencing the shared data during the update operation. In block 46, the updater calls the grace period detection component 26 of the RCU subsystem 20. In block 48, the grace period detection component 26 implements grace period detection with or without multiprocessor coordination based on the way it was compiled in blocks 42A or 42B (i.e., according to whether the system is a uniprocessor system or a multiprocessor system). In block 50, a second-phase update operation is performed (e.g., a stale data element is freed). If the grace period detection is synchronous, the updater $18_1$, $18_2$ ... $18_n$ that performed the first-phase update implements the second-phase update operation of block 50. If the grace period detection is asynchronous, the RCU subsystem 20 will implement block 50.

Figure 8B:
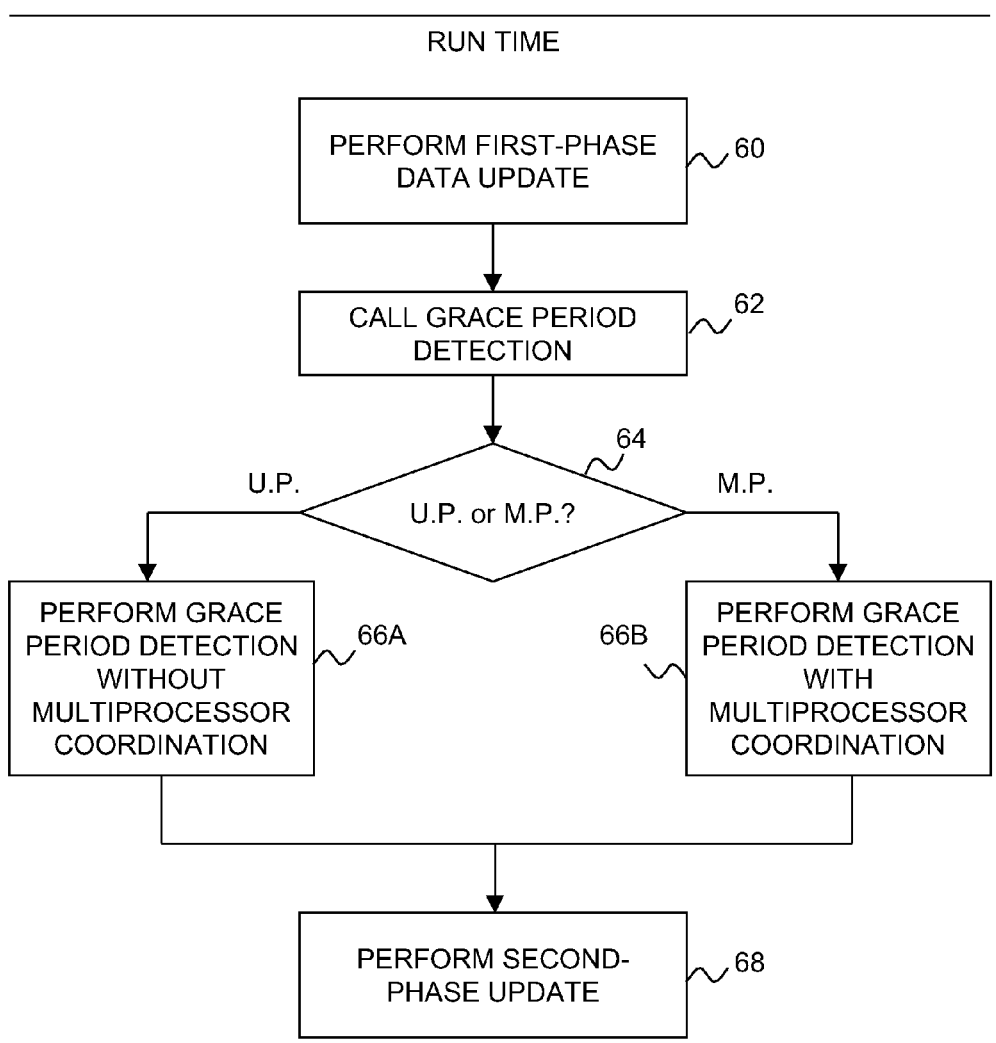
FIG. 8B is a flow diagram showing a second example of optimizing preemptible RCU grace period detection processing in accordance with the technique disclosed herein.

Turning now to FIG. 8B, example processing is shown that may be performed by the RCU subsystem 20 to dynamically condition grace period detection processing at run time. In block 60, an updater $18_1$, $18_2$ ... $18_n$ performs an update to the shared data set 18 shown in FIGS. 4 and 6. In accordance the philosophy of RCU, this update is performed in a manner (first-phase data update) that temporarily preserves a pre-update view of the shared data for the benefit of readers that may be concurrently referencing the shared data during the update operation. In block 62, the updater calls the grace period detection component 26 of the RCU subsystem 20. In block 64, the grace period detection component 26 dynamically determines if the host data processing system is a uniprocessor system or a multiprocessor system. As previously discussed, three possible techniques that may be used include checking system configuration information (e.g., the configuration variable 30 of FIG. 7) provided at compile time, at boot time or at run time. If the data processing system is a uniprocessor system, the RCU subsystem 20 performs grace period detection processing in block 66A using a first grace period detection technique that does not include multiprocessor coordination. If the data processing system is a multiprocessor system, the RCU subsystem 20 performs grace period detection processing in block 66B using a second grace period detection technique that does include multiprocessor coordination. In either case, the grace period detection processing determines the end of a grace period in which no readers can be maintaining references to the pre-update view of the shared data. In block 68, a second-phase update operation is performed (e.g., a stale data element is freed). If the grace period detection is synchronous, the updater $18_1$, $18_2$ ... $18_n$ that performed the first-phase update performs the second-phase update operation of block 50. If the grace period detection is asynchronous, the RCU subsystem 20 will implement block 50.

Specific implementation examples may now be described to illustrate the manner in which the processing of FIGS. 9A and 9B may be implemented by modifying existing preemptible RCU implementations. The examples are respectively based on SRCU and real-time RCU as implemented in current versions of the Linux® kernel. However, other kernel-level preemptible RCU versions, as well as user-level preemptible RCU, could serve as the starting point for implementing the grace period detection optimization technique described herein.

Example 1

SRCU

Sleepable RCU is a preemptible RCU implementation that allows RCU readers to sleep or otherwise delay within RCU critical sections. Because readers may block for extended periods, asynchronous grace period detection is not permitted. Updaters are required to perform synchronous grace period detection. Readers are grouped by subsystem to minimize the likelihood of an errant reader delaying grace period detection for the entire system. Each subsystem is assigned a data structure of type "srcu_struct" that is used by readers within the subsystem for RCU critical section registration and unregistration, and by updaters for grace period detection. Each SRCU data structure holds a (1) count of elapsed grace periods, (2) pointers to per-processor counter pairs, and (3) a mutex lock. Each per-processor counter pair includes an active counter for counting read operations commenced during the current grace period and an inactive counter for counting read operations commenced during the last grace period. The low order bit of the elapsed grace period counter is used to index the per-processor counter that is actively associated with the current grace period.

Figure 5:
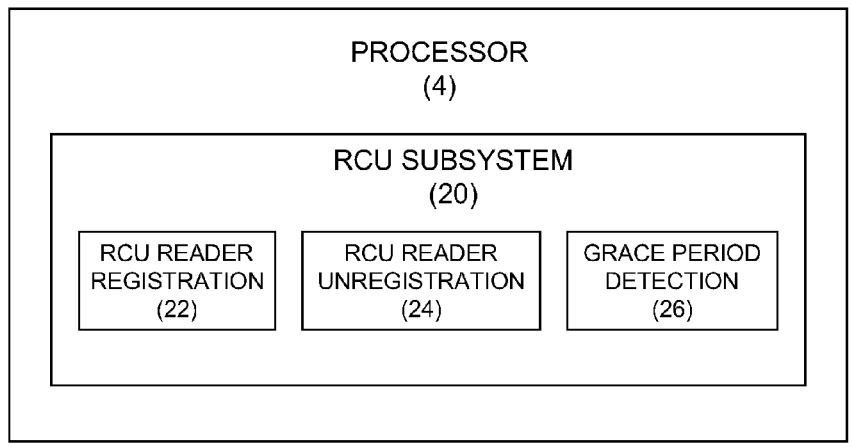
FIG. 5 is a functional block diagram showing a read-copy update subsystem implemented in the computing system of FIG. 4.

In an SRCU implementation, the reader registration component 22 of FIG. 5 could be implemented using the srcu_read_lock( ) primitive. This primitive registers a reader for RCU critical section processing by accessing the applicable SRCU data structure and incrementing the per-processor counter associated with the current grace period and the reader's processor. The reader unregistration component 24 in an SRCU implementation could be implemented using the srcu_read_unlock( ) primitive. This primitive unregisters a reader following RCU critical section processing by decrementing the per-processor counter previously incremented by srcu_read_lock( ).

The grace period detection component 26 in an SRCU implementation may be implemented by the synchronize_srcu( ) primitive. This primitive increments the elapsed grace period count in a given SRCU data structure, thereby swapping the roles of the per-processor counters (referred to as "flipping" the counters), then waits for the counters associated with the previous grace period to drain to zero as readers complete their RCU critical section processing. Second-phase RCU update processing may then be safely performed. In a multiprocessor environment, SRCU grace period detection processing performed on one processor requires careful coordination with other processors. In the synchronize_srcu( ) primitive, this coordination processing is handled by making several calls to a coordination function known as synchronize_sched( ). Note that this a grace period detection primitive used in non-preemptible versions of RCU. It schedules a grace period on each processor, thereby causing each processor to pass through a context switch. As earlier discussed, this type of natural context switch qualifies as a quiescent state in non-preemptible RCU. It is not a suitable way to implement quiescent states in preemptible RCU. However, SRCU does not use the synchronize_sched( ) primitive to force quiescent states. Rather, this primitive is used because it has a side effect of implementing a memory barrier on each processor. This memory barrier side effect provides the requisite multiprocessor coordination required for SRCU. The synchronize_srcu( ) primitive makes several calls to synchronize_sched( ) to implement memory barriers at various stages of the grace period detection operation. This ensures that readers are aware of state changes made on the update side and so that the update side does not proceed without knowing the state of the readers.

Figure 9:
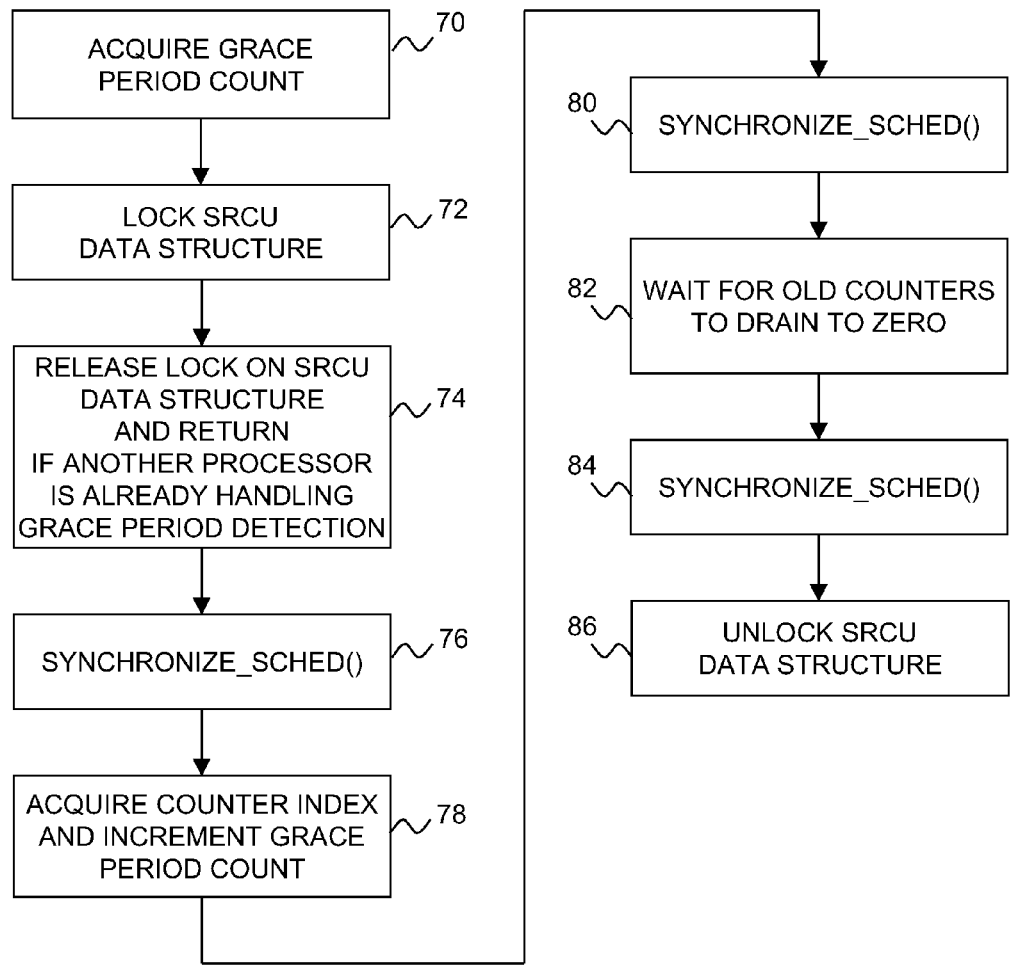
FIG. 9 is a flow diagram showing prior art grace period detection processing performed in a sleepable RCU implementation.

FIG. 9 illustrates conventional operation of the synchronize_srcu( ) primitive. An updater calls synchronize_srcu( ) to initiate grace period detection within a given subsystem by specifying the SRCU data structure associated with that subsystem. In block 70, synchronize_srcu( ) reads the SRCU data structure to determine the current grace period count. In block 72, synchronize_srcu( ) acquires the SRCU data structure lock. In block 74, synchronize_srcu( ) releases the SRCU data structure lock if it determines that another processor is already performing grace period detection on the same data structure. Otherwise, synchronize_srcu( ) calls synchronize_sched( ) in block 76. The resultant memory barrier executed on each processor ensures that such processors will see the first-phase data update made by the updater that called synchronize_srcu( ) before further grace period detection processing is performed. This prevents some other processor from reordering the accesses in its RCU read-side critical section to precede the corresponding call to srcu_read_lock( ), ensuring that such references will in fact be protected. In block 78, synchronize_srcu( ) acquires the current per-processor counter index and increments the grace period count (thereby flipping the counters). In block 80, synchronize_srcu( ) again calls synchronize_sched( ). The resultant memory barrier executed on each processor ensures that all srcu_read_lock( ) calls using the old counters will have completed prior to the readers entering their RCU critical sections. The critical sections might well be still executing, but will be protected because the srcu_read_lock( ) primitives themselves have finished executing. In block 82, synchronize_srcu( ) waits for the per-processor counters associated with the last grace period (the ones corresponding to the index acquired in block 78) to decrement to zero. In block 84, synchronize_srcu( ) again calls synchronize_sched( ). The resultant memory barrier executed on each processor ensures that all srcu_read_unlock( ) primitives that were executing concurrently with block 82 have completed by this point. More importantly, the memory barrier forces the corresponding RCU read-side critical sections to have completed, and the corresponding references to RCU-protected data items to be dropped. In block 86, synchronize_srcu( ) releases the SRCU data structure lock, thereby completing grace period detection processing.

Figure 10:
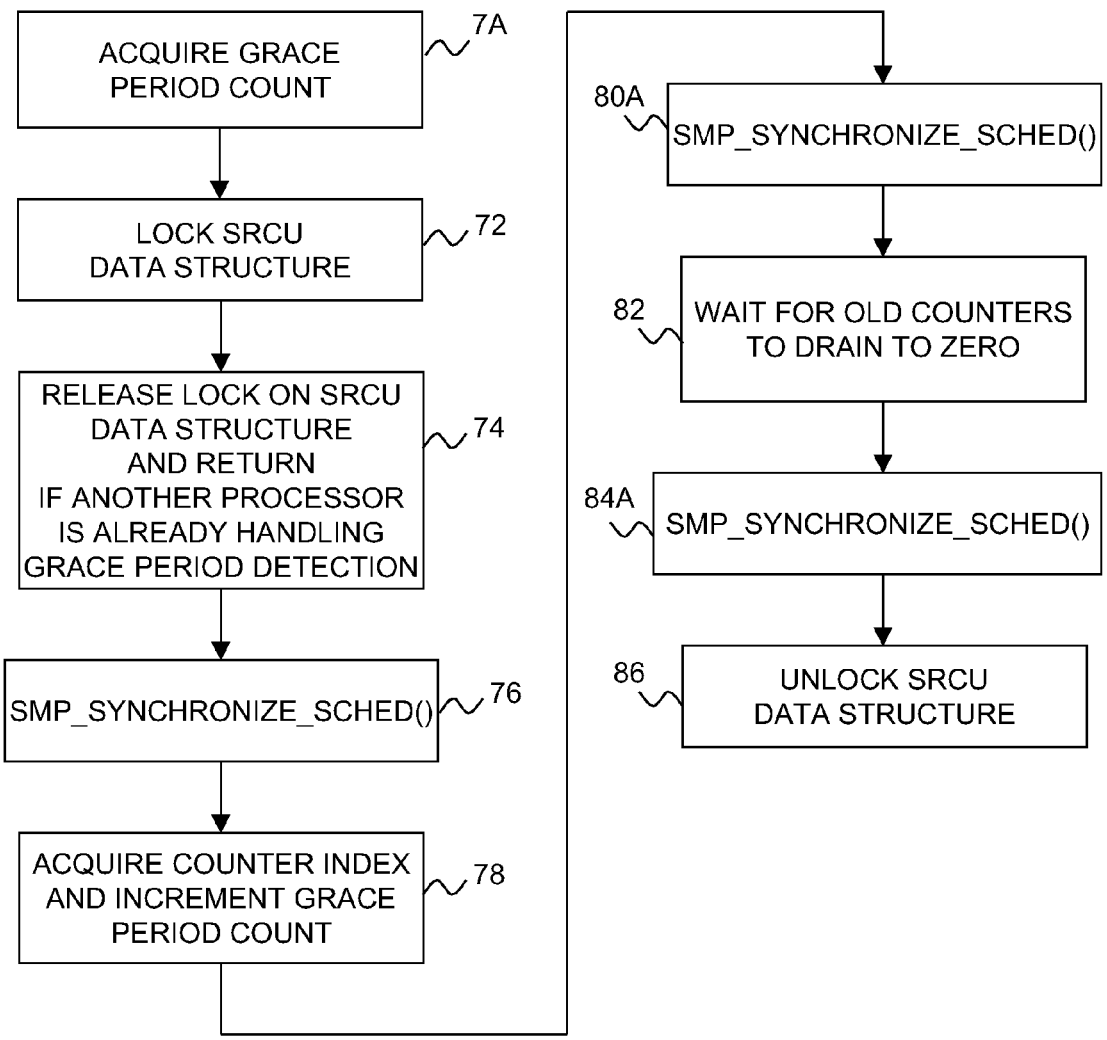
FIG. 10 is a flow diagram showing optimized grace period detection for uniprocessor operation that may be performed in a sleepable RCU implementation.

In accordance with the grace period optimization technique described herein, the synchronize_srcu( ) primitive can be optimized for uniprocessor operation by modifying the synchronize_sched( ) calls. If the optimization is performed at compile time, synchronize_srcu( ) may be modified to call a new function smp_synchronize_sched( ) instead of synchronize_sched( ). The use of this function is shown in FIG. 10, which corresponds to FIG. 9 and uses corresponding reference numbers (with the letter "A" added to each number), except that the synchronize_sched( ) calls have been replaced with the new smp_synchronize_sched( ) function. The following compiler preprocessor directives that conditionally define smp_synchronize_sched( ) may then be used:

```
#ifdef CONFIG_SMP
#define smp_synchronize_sched( ) synchronize_sched( )
#else
#define smp_synchronize_sched( ) barrier( )
#endif
```

If a multiprocessor system is present, smp_synchronize_sched( ) will compile to the original synchronize_sched( ) primitive. Otherwise, smp_synchronize_sched( ) compiles to a primitive named "barrier( )." This primitive prohibits the compiler from reordering memory references across the smp_synchronize_sched( ) invocation in synchronize_srcu( ), but does not implement the memory barriers used for multiprocessor coordination in synchronize_sched( ).

Figure 11:
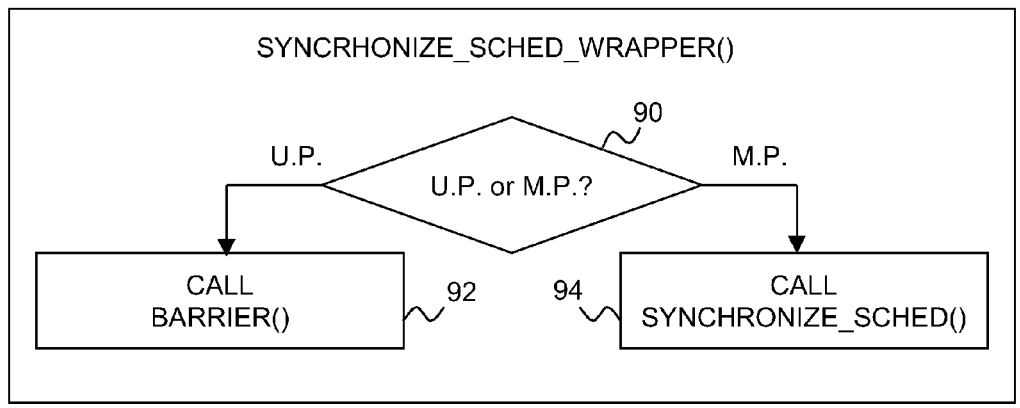
FIG. 11 is a flow diagram showing a modified synchronize_shed( ) function that supports optimized grace period detection for uniprocessor operation that may be performed in a sleepable RCU implementation.

If it is desired to perform uniprocessor optimization at run time, synchronize_srcu( ) can be modified to conditionally call synchronize_sched( ) in a multiprocessor environment, and call barrier( ) in a uniprocessor environment. In that case, synchronize_sched( ) could be replaced in synchronize_srcu( ) with a wrapper function (e.g., synchronize_sched_wrapper( ) that performs the processing shown in FIG. 11. In block 90, synchronize_sched_wrapper( ) determines whether it is in a uniprocessor or multiprocessor environment. Again, three possible ways that this could be done are to check system configuration information (e.g., the configuration variable 30 of FIG. 5) provided at compile time, at boot time or at run time. If a uniprocessor environment is detected, a call is made to barrier( ) in block 92. If a multiprocessor environment is detected, a call is made to synchronize_sched( ) in block 94.

Example 2

Real-Time RCU

Real-time RCU is a preemptible RCU version that protects RCU readers from premature grace period processing even if the readers are preempted. Readers are tracked using per-processor counter pairs that are indexed using the current grace period number. As in SRCU, one of the per-processor counters is incremented/decremented by readers who began their RCU critical during the current grace period. The other per-processor counter is used by readers that began their RCU critical sections during the last grace period. Once a new grace period is started, the counters associated with the previous grace period are only decremented, and thus will ultimately count down to zero as readers complete their critical sections. In a real-time RCU implementation, the reader registration component 22 of FIG. 5 could be implemented using the rcu_read_lock( ) primitive. This primitive registers a reader for RCU critical section by incrementing the per-processor counter associated with the current grace period. The reader unregistration component 24 in a real-time RCU implementation could be implemented using the rcu_read_unlock( ) primitive. This primitive unregisters a reader following RCU critical section processing by decrementing the per-processor counter previously incremented by rcu_read_lock( ) or, if the reader was preempted and reinstated on a different processor, the per-processor counter on the new processor that corresponds to the reader's grace period.

Figure 12:
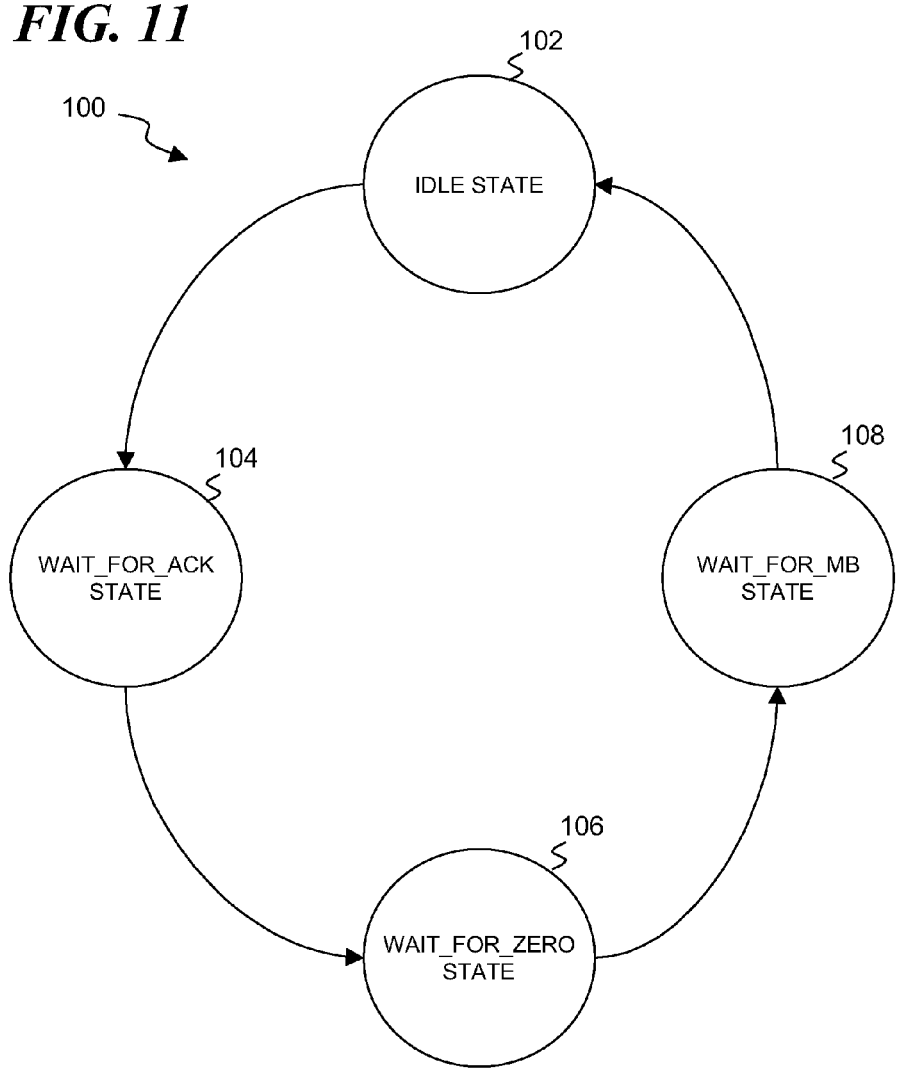
FIG. 12 is a flow diagram showing a prior art state machine used in a real-time RCU implementation.

The grace period detection component 26 in a real-time RCU implementation may be implemented by the rcu_try_flip( ) primitive. The grace period detection algorithm implemented by this primitive uses a state machine to coordinate grace period processing on multiple processors. The state machine 100 and its grace period detection states 102-108 are shown in FIG. 12. The grace period detection algorithm implemented by rcu_try_flip( ) is invoked on each processor at each scheduling clock interrupt. For each state, rcu_try_flip( ) invokes a separate function (as indicated by the names of the states 102-108). If the function returns 0, the state machine remains in the same state. If the function returns 1, the state machine advances. Several cycles are required to complete a given grace period.

Figure 13:
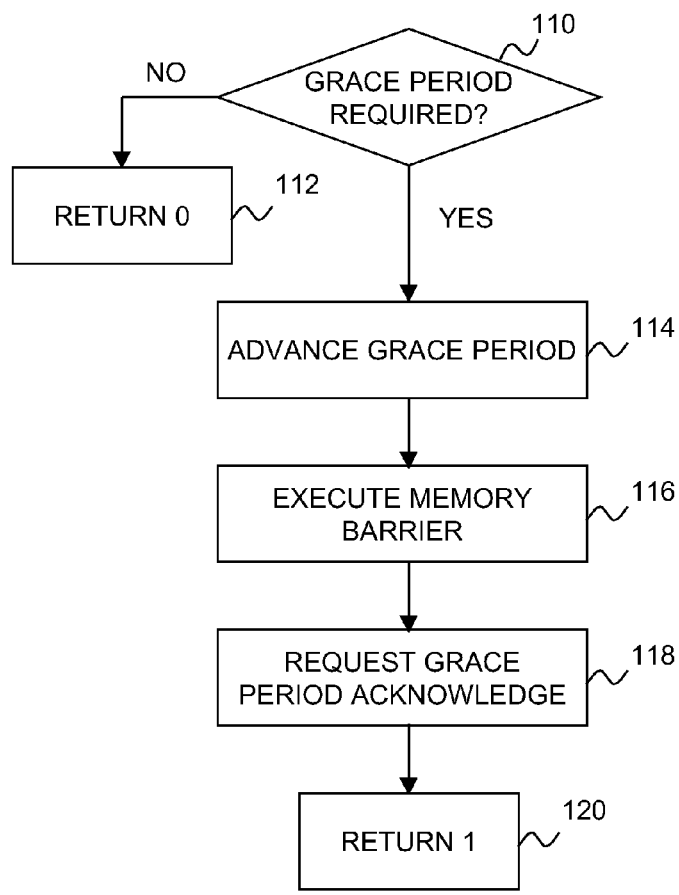
FIG. 13 is a flow diagram showing a prior art function implemented in a first state of the state machine of FIG. 12.

State 102 is an idle state wherein no grace period detection is in progress. In this state, rcu_try_flip( ) calls a function known as rcu_try_flip_idle( ). This function's processing is shown in FIG. 13. The function determines in block 110 whether a new grace period is required due to one or more updaters performing first-phase RCU update processing. If negative, the function returns a value of zero in block 112 and the rcu_try_flip( ) state machine remains in the idle state. If a new grace period is required, it is started in block 114. A memory barrier instruction is then executed in block 116 so that other processors see the new grace period. Each processor is then requested in block 118 to acknowledge the new grace period. The function returns a value of one in block 120 and the rcu_try_flip( ) state machine advances to the next state, which is state 104.

Figure 14:
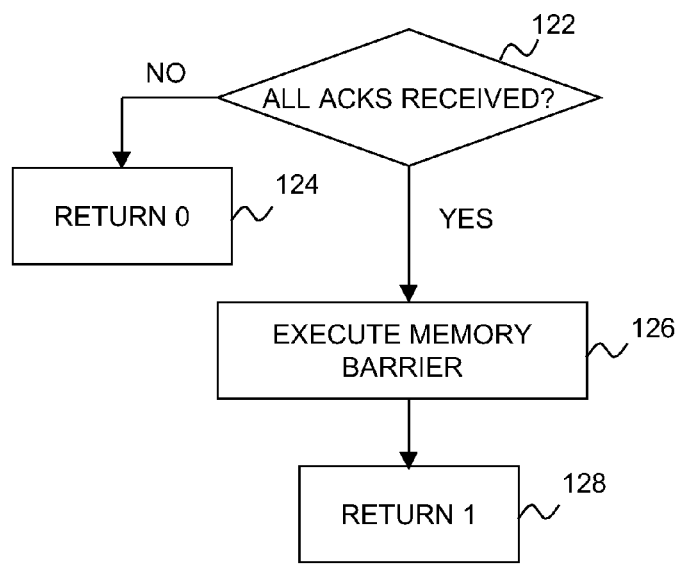
FIG. 14 is a flow diagram showing a prior art function implemented in a second state of the state machine of FIG. 12.

State 104 is a wait_for_acknowledgement state that waits for each processor to perform the acknowledgement requested in state 102. In this state, rcu_try_flip( ) calls a function known as rcu_try_flip_waitack( ). This function's processing is shown in FIG. 14. The function determines in block 122 whether new grace period acknowledgements have been received from all processors. If negative, the function returns a value of zero in block 124 and the rcu_try_flip( ) state machine remains in the wait_for_acknowledgement state. If all acknowledgements have been received, a memory barrier instruction is executed in block 126 to ensure that all acknowledgements are received before counter monitoring is performed. The function then returns a value of one in block 128 and the rcu_try_flip( ) state machine advances to the next state, which is state 106.

Figure 15:
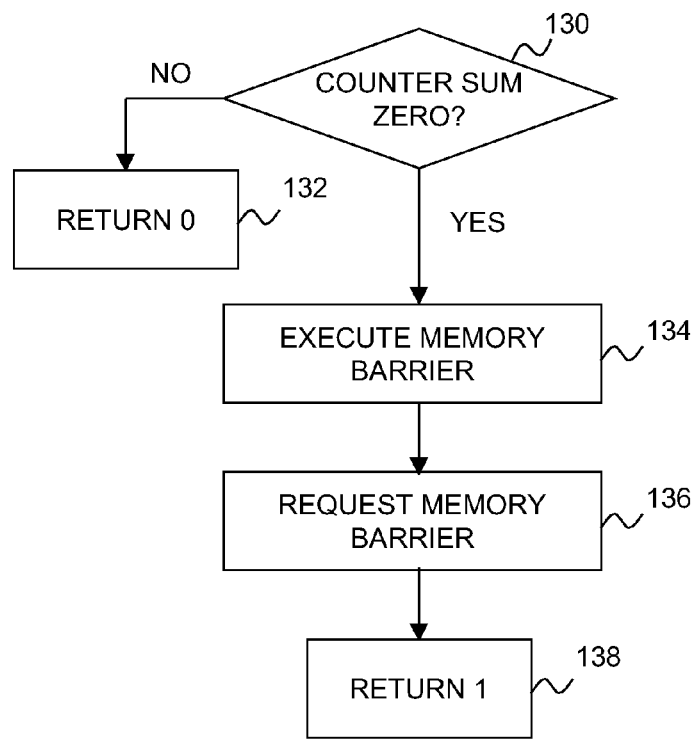
FIG. 15 is a flow diagram showing a prior art function implemented in a third state of the state machine of FIG. 12.

State 106 is a wait_for_zero state that waits for all of the counters of the previous grace period to reach zero. In this state, rcu_try_flip( ) calls a function known as rcu_try_flip_waitzero( ). This function's processing is shown in FIG. 15. The function determines in block 130 whether the sum of all per-processor counters for the previous grace period is zero. If negative, the function returns a value of zero in block 132 and the rcu_try_flip( ) state machine remains in the wait_for_zero state. If the counter sum is zero, a memory barrier instruction is executed in block 134 to ensure that subsequent processing does not proceed before the counters are all actually zero. The function then requests in block 136 that all processors implement a memory barrier. This ensures that all RCU critical section processing will have been completed by readers before second-phase RCU update processing is performed. The function then returns a value of one in block 138 and the rcu_try_flip( ) state machine advances to the next state, which is state 108.

Figure 16:
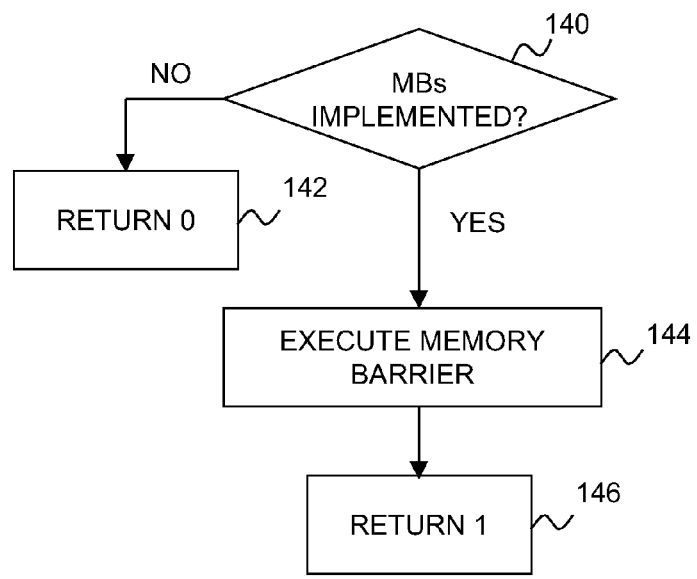
FIG. 16 is a flow diagram showing a prior art function implemented in a fourth state of the state machine of FIG. 12.

State 108 is a wait_for_mb state that waits for all of the processors to implement memory barriers. In this state, rcu_try_flip( ) calls a function known as rcu_try_flip_waitmb( ). This function's processing is shown in FIG. 16. The function determines in block 140 whether all processors have implemented a memory barrier. If negative, the function returns a value of zero in block 142 and the rcu_try_flip( ) state machine remains in the wait_for_mb state. If all memory barriers have been implemented, a memory barrier instruction is executed in block 144 to ensure that the memory barrier checks precede any subsequent grace period advancement. The function then requests then returns a value of one in block 146 and the rcu_try_flip( ) state machine advances to the next state, which is the idle state 102. At this point, second-phase RCU update processing may be performed (e.g., to free stale data associated with the previous grace period).

Figure 17:
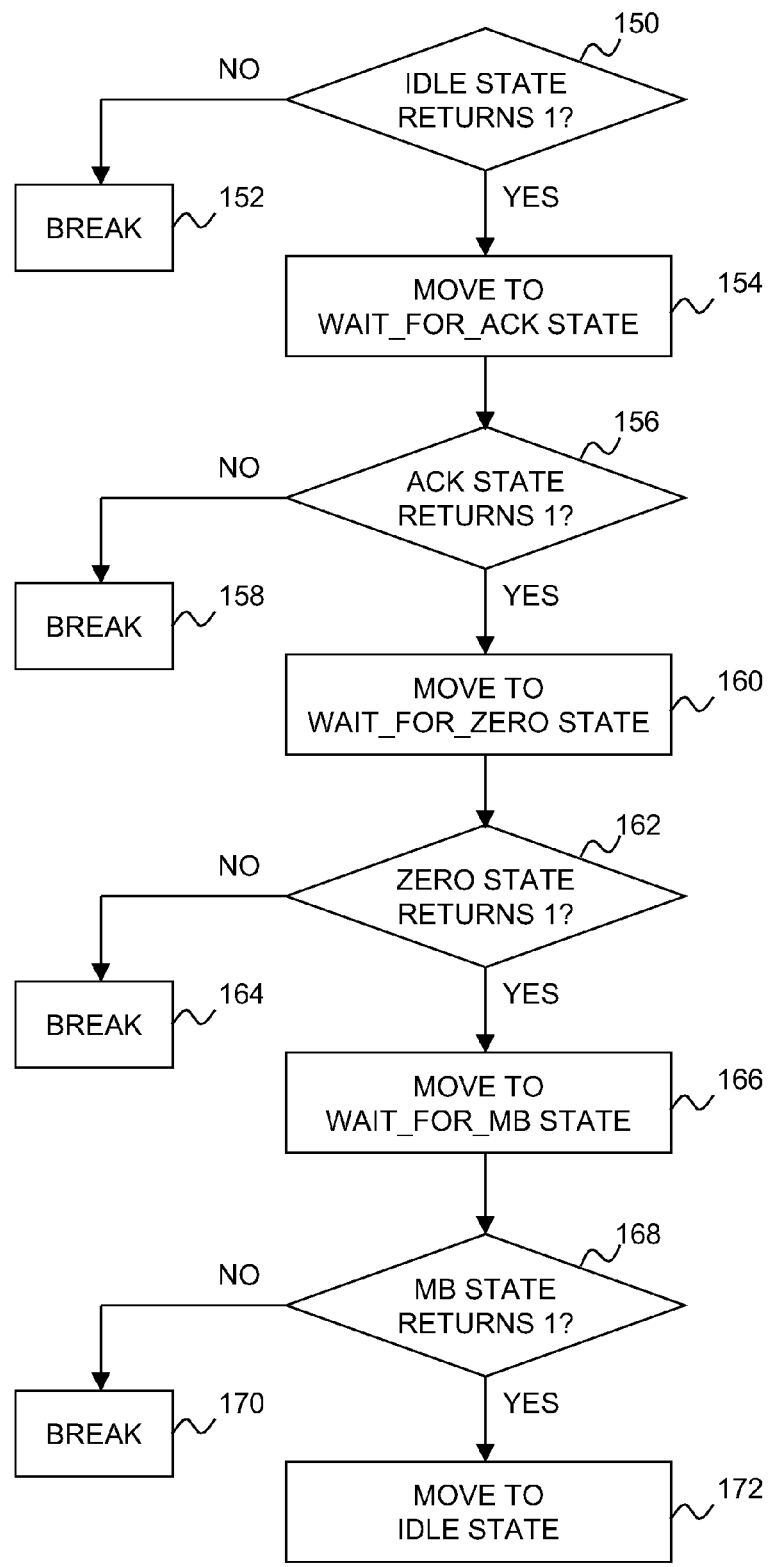
FIG. 17 is a flow diagram showing another view of the prior art state machine of FIG. 12.

The state machine processing performed by rcu_try_flip( ) is shown in FIG. 17. In block 150, rcu_try_flip( ) calls the try_flip_idle( ) function (FIG. 13) and checks the return value. If the return value is zero, rcu_try_flip( ) breaks in block 152 without advancing to a new state. If the return value is one, rcu_try_flip( ) advances to the wait_for_acknowledgement state 104 in block 154.

In block 156, rcu_try_flip( ) calls the rcu_try_flip_waitack( ) function (FIG. 14) and checks the return value. If the return value is zero, rcu_try_flip( ) breaks in block 158 without advancing to a new state. If the return value is one, rcu_try_flip( ) advances to the wait_for_zero state 106 in block 160.

In block 162, rcu_try_flip( ) calls the rcu_try_flip_waitzero( ) function (FIG. 15) and checks the return value. If the return value is zero, rcu_try_flip( ) breaks in block 164 without advancing to a new state. If the return value is one, rcu_try_flip( ) advances to the wait_for_mb state 108 in block 166.

In block 168, rcu_try_flip( ) calls the rcu_try_flip_waitmb( ) function (FIG. 16) and checks the return value. If the return value is zero, rcu_try_flip( ) breaks in block 170 without advancing to a new state. If the return value is one, rcu_try_flip( ) advances to the idle state 102 in block 172. Again, at this point, second-phase RCU update processing may be performed.

In accordance with the grace period optimization technique described herein, the real-time RCU rcu_try_flip( ) primitive can be optimized for uniprocessor operation by eliminating states 104 and 108 of FIG. 12. If the optimization is performed at compile time, the rcu_try_flip( ) state machine primitive can be compiled to bypass states 104 and 108 for uniprocessors. Alternatively, the rcu_try_flip_waitack( ) and rcu_try_flip_waitmb( ) functions associated with states 104 and 108 may be compiled for uniprocessor operation to simply return a value of one (to advance the state machine) without performing any other processing.

If it is desired to perform uniprocessor optimization at run time, the rcu_try_flip( ) state machine can be modified to conditionally enter states 104 and 108 in a multiprocessor environment, and bypass those states in a uniprocessor environment. Alternatively, the rcu_try_flip_waitack( ) and rcu_try_flip_waitmb( ) functions associated with states 104 and 108 may be modified to conditionally return a value of one (to advance the state machine) without performing any other processing. Again, three possible ways that this could be done are to check system configuration information (e.g., the system configuration variable 30 of FIG. 5) provided at compile time, at boot time or at run time.

Figure 18A:
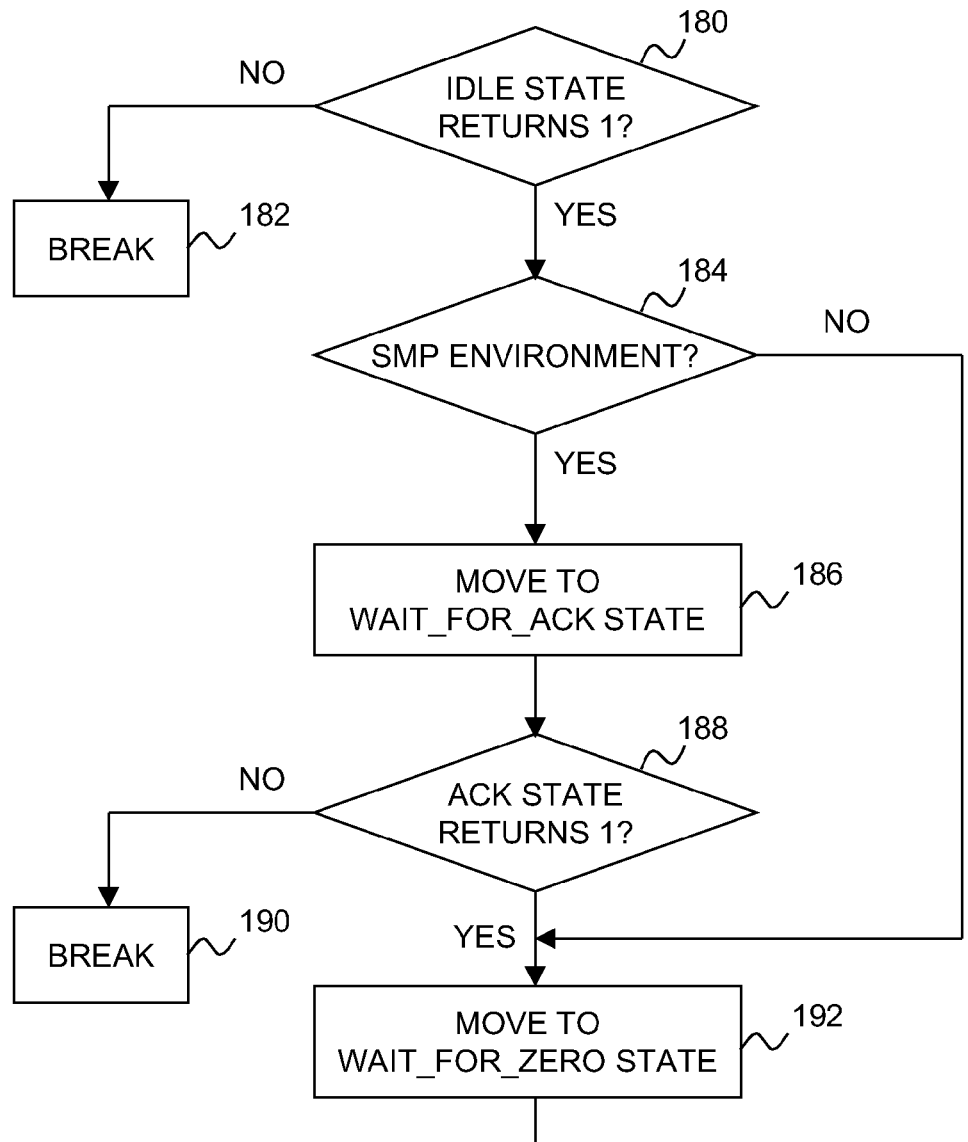
FIGS. 18A and 18B represent a flow diagram showing a modification of the state machine of FIG. 12 with optimized grace period detection for uniprocessor operation that may be performed in a real-time RCU implementation.
Figure 18B:
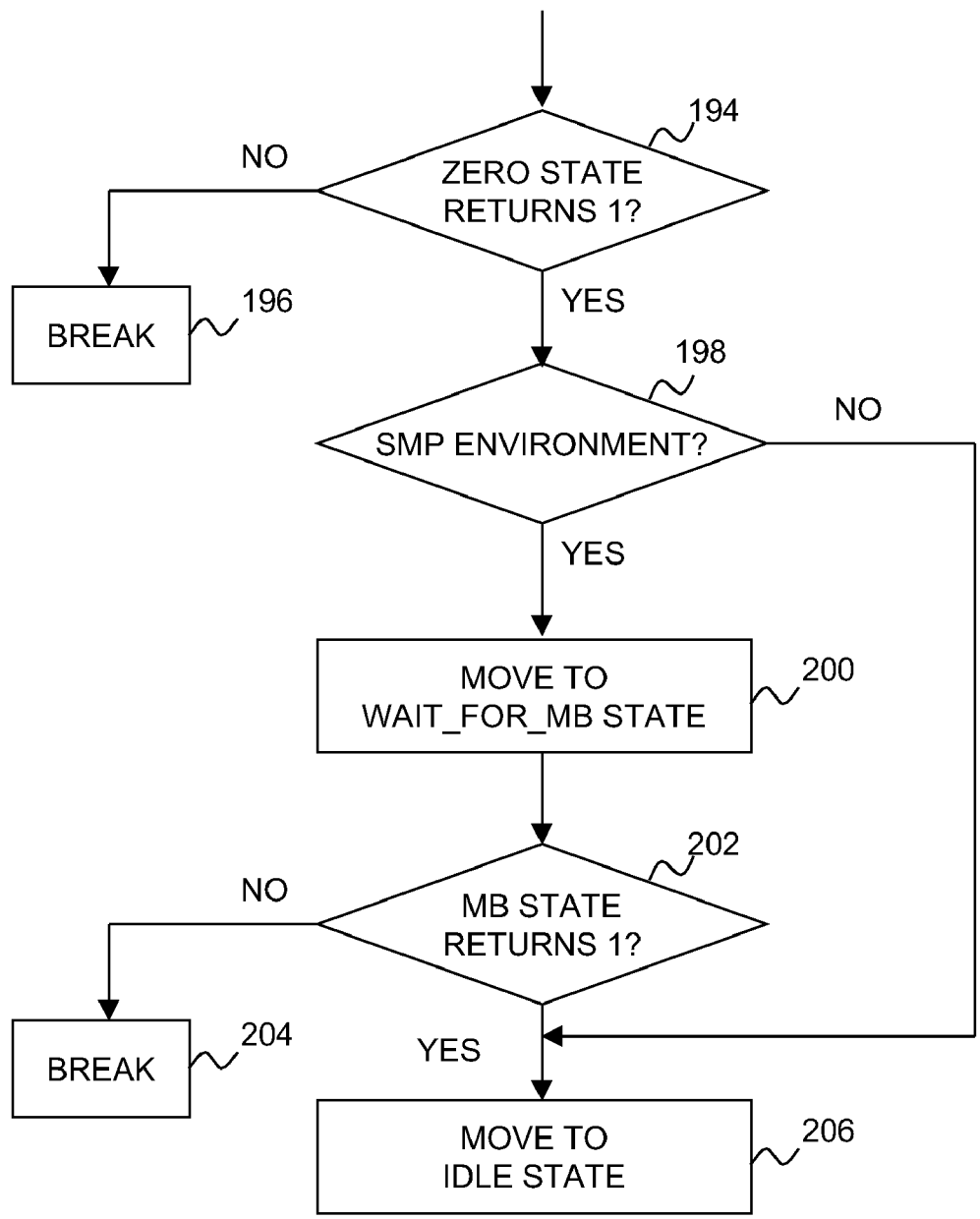

FIGS. 18A-18B illustrate a modified version of the rcu_try_flip( ) state machine in which grace period detection processing is dynamically conditioned at run time according to whether a uniprocessor or multiprocessor system obtains. Referring to FIG. 18A, in block 180, rcu_try_flip( ) calls the try_flip_idle( ) function (FIG. 13) and checks the return value. If the return value is zero, rcu_try_flip( ) breaks in block 182 without advancing to a new state. If the return value is one, rcu_try_flip( ) checks in block 184 whether a multiprocessor environment is present. If true, the state machine advances to the wait_for_acknowledgement state 104 in block 186.

In block 188, rcu_try_flip( ) calls the rcu_try_flip_waitack( ) function (FIG. 14) and checks the return value. If the return value is zero, rcu_try_flip( ) breaks in block 190 without advancing to a new state. If the return value is one, rcu_try_flip( ) advances to the wait_for_zero state 106 in block 192. The state machine also advances to the wait_for_zero state 106 if the check in block 184 determines that a uniprocessor environment is present. In that case, the wait_for_acknowledgement state 104 is superfluous and may be eliminated.

Referring now to FIG. 18B, in block 194, rcu_try_flip( ) calls the rcu_try_flip_waitzero( ) function (FIG. 15) and checks the return value. If the return value is zero, rcu_try_flip( ) breaks in block 196 without advancing to a new state. If the return value is one, rcu_try_flip( ) checks in block 198 whether a multiprocessor environment is present. If true, the state machine advances to the wait_for_mb state 108 in block 200.

In block 202, rcu_try_flip( ) calls the rcu_try_flip_mb( ) function (FIG. 16) and checks the return value. If the return value is zero, rcu_try_flip( ) breaks in block 204 without advancing to a new state. If the return value is one, rcu_try_flip( ) advances to the idle state 102 in block 206. The state machine also advances to the idle state 102 if the check in block 198 determines that a uniprocessor environment is present. In that case, the wait_for_mb state 108 is superfluous and may be eliminated.

Figure 19:
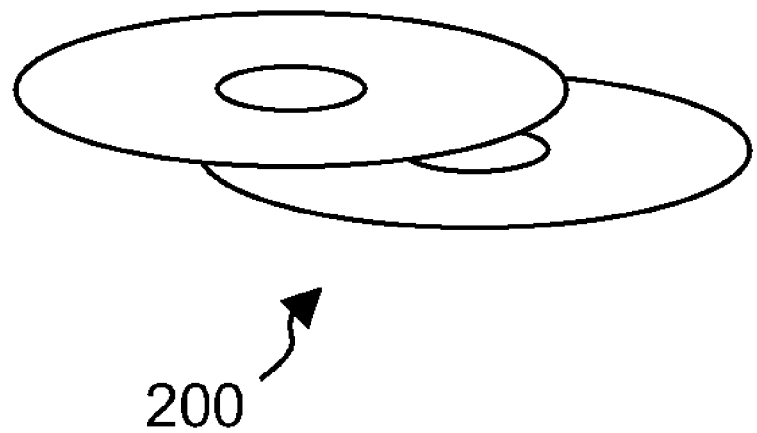
FIG. 19 is a diagrammatic illustration of media that can be used to provide a computer program product for implementing uniprocessor-optimized RCU grace period detection.

Accordingly, a grace period detection optimization technique for uniprocessor systems has been disclosed. It will be appreciated that the foregoing concepts may be variously embodied in any of a data processing system, a machine implemented method, and a computer program product in which programming means are provided by one or more machine-readable media for use in controlling a data processing system to perform the required functions. Example machine-readable media for providing such programming means are shown by reference numeral 300 in FIG. 19. The media 300 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming means of the invention, either alone or in conjunction with another software product that incorporates the required functionality. The programming means could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation medium or signal, or other entity that can contain, store, communicate, propagate or transport the programming means for use by or in connection with a data processing system, computer or other instruction execution system, apparatus or device.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method comprising:
   determining if a data processing system that is to perform grace period detection following a data element update operation on shared data is a uniprocessor system or a multiprocessor system;
   performing grace period detection processing using a first grace period detection technique if said data processing system is a multiprocessor system;
   performing grace period detection processing using a second grace period detection technique if said data processing system is a uniprocessor system; and
   said grace period detection processing according to either technique determining an end of a grace period in which readers that are subject to preemption have passed through a quiescent state and cannot be maintaining references to a pre-update view of said shared data.

2. The method of claim 1, wherein said first grace period detection technique comprises multiprocessor coordination processing and said second grace period detection technique does not comprise said multiprocessor coordination processing.

3. The method of claim 2, wherein said multiprocessor coordination processing comprises executing memory barriers, waiting for acknowledgements of new grace periods, or both.

4. The method of claim 1, wherein said determining is performed at compile time so that said grace period detection processing is statically compiled to perform either said first grace period detection technique or said second grace period detection technique.

5. The method of claim 1, wherein said determining is performed at run time so that said grace period detection processing is dynamically conditioned to perform either said first grace period detection technique or said second grace period detection technique.

6. The method of claim 5, wherein said determining is based on system configuration information provided at compile time, at boot time or at run time.

7. A data processing system, comprising:
   one or more processors;
   a memory coupled to said one or more processors, said memory including a computer useable storage medium tangibly embodying at least one program of instructions executable by said one or more processors to perform operations for optimizing grace period detection following a data element update operation on shared data that affects preemptible data readers, comprising:

determining if said data processing system is a uniprocessor system or a multiprocessor system;
performing grace period detection processing using a first grace period detection technique if said data processing system is a multiprocessor system;
performing grace period detection processing using a second grace period detection technique if said data processing system is a uniprocessor system; and
said grace period detection processing according to either technique determining an end of a grace period in which readers that are subject to preemption have passed through a quiescent state and cannot be maintaining references to a pre-update view of said shared data.

8. The system of claim 7, wherein said first grace period detection technique comprises multiprocessor coordination processing and said second grace period detection technique does not comprise said multiprocessor coordination processing.

9. The system of claim 8, wherein said multiprocessor coordination processing comprises executing memory barriers, waiting for acknowledgements of new grace periods, or both.

10. The system of claim 7, wherein said determining is performed at compile time so that said grace period detection processing is statically compiled to perform either said first grace period detection technique or said second grace period detection technique.

11. The system of claim 7, wherein said determining is performed at run time so that said grace period detection processing is dynamically conditioned to perform either said first grace period detection technique or said second grace period detection technique.

12. The system of claim 11, wherein said determining is based on system configuration information provided at compile time, at boot time or at run time.

13. A computer program product, comprising:
one or more machine-readable storage media;
means provided by said one or more media for programming a data processing system to optimize grace period detection following a data element update operation on shared data that affects preemptible data readers, as by:
determining if said data processing system is a uniprocessor system or a multiprocessor system;
performing grace period detection processing using a first grace period detection technique if said data processing system is a multiprocessor system;
performing grace period detection processing using a second grace period detection technique if said data processing system is a uniprocessor system; and
said grace period detection processing according to either technique determining the end of a grace period in which readers that are subject to preemption have passed through a quiescent state and cannot be maintaining references to a pre-update view of said shared data.

14. The computer program product of claim 13, wherein said first grace period detection technique comprises multiprocessor coordination processing and said second grace period detection technique does not comprise said multiprocessor coordination processing.

15. The computer program product of claim 14, wherein said multiprocessor coordination processing comprises executing memory barriers, waiting for acknowledgements of new grace periods, or both.

16. The computer program product of claim 13, wherein said determining is performed at compile time so that said grace period detection processing is statically compiled to perform either said first grace period detection technique or said second grace period detection technique.

17. The computer program product of claim 13, wherein said determining is performed at run time so that said grace period detection processing is dynamically conditioned to perform either said first grace period detection technique or said second grace period detection technique.

18. The computer program product of claim 17, wherein said determining is based on system configuration information provided at compile time, at boot time or at run time.

19. A method for optimizing grace period detection following a data element update operation in a data processing system having preemptible readers, comprising:
performing a first-phase data update operation on shared data in a manner that temporarily preserves a pre-update view of said shared data for benefit of readers that may be concurrently referencing said shared data during said update operation;
dynamically determining if said data processing system is a uniprocessor system or a multiprocessor system;
performing grace period detection processing using a first grace period detection technique if said data processing system is a multiprocessor system;
performing grace period detection processing using a second grace period detection technique if said data processing system is a uniprocessor system;
said grace period detection processing according to either technique determining an end of a grace period in which readers that are subject to preemption have passed through a quiescent state and cannot be maintaining references to a pre-update view of said shared data; and
performing a second-phase update operation following said grace period.

20. The method of claim 19, wherein said determining is based on system configuration information provided at compile time, at boot time or at run time.

* * * * *